Patented Aug. 22, 1939

2,170,037

UNITED STATES PATENT OFFICE 2,170,037

ACCELERATOR OF VULCANIZATION

Waldo L. Semon, Silver Lake Village, Ohio, assignor to The B. F. Goodrich Company, New York, N. Y., a corporation of New York No Drawing. Application October 26, 1937, Serial No. 171,064

20 Claims. (Cl. 18—53)

This invention relates to the art of rubber manufacture and has as its object to provide a new and improved class of accelerators.

Derivatives of dithiocarbamic acids were among the first known organic accelerators. The dialkyl dithiocarbamates which were first prepared were thought to be very useful, since they are so active that they are capable of inducing vulcanization of rubber even at room temperatures. It was soon discovered, however, that this property was a great disadvantage, since the rubber prevulcanized or "scorched" while it was being mixed, calendered, extruded, or even while it was standing, making such accelerators practically useless for compounding in rubber on an industrial scale. This uncontrollability resulted in a search for less active materials.

In the process of this invention, the vulcanization of rubber is accelerated by incorporating therewith a compound selected from the class consisting of o,o′ alkylidene-diaryl dithiocarbamic acids and their derivatives formed by replacement of the hydrogen of the sulfhydryl group. For example, o,o′ methylene-diphenyl dithiocarbamic acid and the corresponding o,o′ ethylidene, o,o′ propylidene, o,o′ isopropylidene, o,o′ sec. butylidene, and o,o′ isoamylene diaryl dithiocarbamic acids are all excellent accelerators of vulcanization. The term "alkylidene" is used to include aralylidene groups such as the benzal group. Besides o,o′ alkylidene diphenyl dithiocarbamic acids, the corresponding alkylidene ditolyl (meta, para, or mixed), dinaphthyl, phenyl naphthyl, etc. dithiocarbamic acids may be used. The presence of an ortho carbon bridge, however, is essential in all of the compounds. Although the compounds of my invention are excellent accelerators, the carbazole type compounds formed by removing the ortho carbon bridge and having merely a bond between the two nuclear ortho carbon atoms have practically no activity as accelerators.

Since the free acids are not perfectly stable, I prefer to use a derivative in which the hydrogen on the sulfhydryl group has been replaced, thereby forming a more stable compound. Suitable derivatives include metallic salts such as the sodium and zinc o,o′ alkylidene-diaryl dithiocarbamates; ammonium salts such as the benzyl hexamethylene-tetrammonium, tetraalkylammonium, and alkylpyridinium salts of the acids; esters such as the polynitrophenyl and alkylene bis esters of the acids; and thiuram sulfides and polysulfides derived from the acids such as bis (o,o′ alkylidene-diaryl) thiuram disulfides and bis (o,o′ alkylidene-diaryl) thiuram tetrasulfides.

All of these materials may be used as accelerators, and are especially useful in that they are free from a tendency to cause scorching. The accelerators of this invention belong to the class known as "delayed action" accelerators because they cause no cure for a short time at curing temperatures, but the vulcanization, when it starts, proceeds rapidly to produce products having high tensile strength.

The majority of these compounds are readily prepared from meso, meso disubstituted acridanes. As an example, meso, meso dimethyl acridane may be reacted with sodium to form the N-sodium salt which reacts with carbon disulfide to form sodium o,o′ isopropylidine-diphenyl dithiocarbamate whose structural formula is

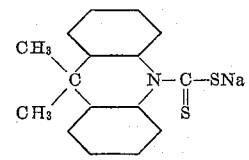

This compound may be used as an accelerator, but if it is desired to use the free acid or other derivatives, they may be prepared by the ordinary methods well known to organic chemists. Bis (o,o′ isopropylidene-diphenyl) thiuram disulfide, for instance, is formed by oxidizing the alkali metal salt formed as indicated above, with iodine or other suitable oxidizing agent.

As a specific example of one embodiment of the method of this invention, a rubber composition is prepared by mixing rubber 100 parts by weight, zinc oxide 5 parts, stearic acid 1 part, sulfur 3.5 parts, and bis (o,o′ isopropylidene-diphenyl) thiuram disulfide 0.5 part. When this composition is heated in a press for 30 minutes at 240° F., there is no cure. By heating for 60 minutes at the same temperature, however, a well-cured composition having a tensile strength of 4250 lbs., per sq. in. is formed. This delayed action, as has heretofore been pointed out, is a very desirable property in an accelerator. Similar excellent results may be obtained with zinc o,o′ isopropylidene-diphenyl dithiocarbamate, 2,4 dinitrophenyl o,o′ isopropylidene-diphenyl dithiocarbamate, or indeed any member of the class of compounds mentioned above.

It is to be understood that the specific examples given above are merely illustrative of one manner of use of the accelerators of this invention;

that other accelerators within the scope of the class herein defined may be substituted for the specific compounds used in the examples; that the accelerators of this invention may be used to vulcanize rubber broadly, including caoutchouc, balata, gutta-percha, synthetic rubber, or natural or artificially prepared latex; that the accelerators may be incorporated in the rubber by mastication or milling, or in the case of latex or other dispersion or solution, by simply adding a solution or suspension thereto; that the accelerators may be used in admixture with each other or other known accelerators, or with antioxidants, organic acids, amines, softeners, pigments, fillers, etc.; and that the rubber may be vulcanized with the assistance of this new class of accelerators in other manners than that particularly set forth above; specifically, it may be vulcanized in hot air, steam, hot water, etc. The accelerators of this invention may advantageously be used in as low a proportion as 0.1% of the rubber in the composition, in which case 3 or 4% of sulfur is generally required, or as high as 5%, with a much reduced quantity of sulfur.

The scope of this invention is accordingly not to be limited to the specific examples herein set forth, but it is to be limited only as required by the prior art and as indicated in the appended claims.

I claim:

1. The process which comprises vulcanizing rubber in the presence of a member of the class consisting of o,o' alkylidene-diaryl dithiocarbamic acids and their derivatives formed by replacement of the hydrogen of the sulfhydryl group.

2. The process which comprises vulcanizing rubber in the presence of a salt of an o,o' alkylidene-diaryl dithiocarbamic acid.

3. The process which comprises vulcanizing rubber in the presence of a metallic salt of an o,o' alkylidene-diaryl dithiocarbamic acid.

4. The process which comprises vulcanizing rubber in the presence of zinc o,o' isopropylidene-diphenyl dithiocarbamate.

5. The process which comprises vulcanizing rubber in the presence of an o,o' alkylidene-diaryl thiuram sulfide.

6. The process which comprises vulcanizing rubber in the presence of a bis (o,o' alkylidene-diaryl) thiuram disulfide.

7. The process which comprises vulcanizing rubber in the presence of bis (o,o' isopropylidene-diphenyl) thiuram disulfide.

8. The process which comprises vulcanizing rubber in the presence of an ester of an o,o' alkylidene-diaryl dithiocarbamic acid.

9. The process which comprises vulcanizing rubber in the presence of a 2,4 dinitrophenyl o,o' alkylidene-diaryl dithiocarbamate.

10. The process which comprises vulcanizing rubber in the presence of 2,4 dinitrophenyl o,o' isopropylidene-diphenyl dithiocarbamate.

11. The process which comprises heating a mixture of rubber, sulfur and a member of the class consisting of o,o' alkylidene-diaryl dithiocarbamic acids and their derivatives formed by replacement of the hydrogen of the sulfhydryl group.

12. A rubber composition which has been vulcanized in the presence of a member of the class consisting of o,o' alkylidene-diaryl dithiocarbamic acids and their derivatives formed by replacement of the hydrogen of the sulfhydryl group.

13. A rubber composition which has been vulcanized in the presence of a salt of an o,o' alkylidene-diaryl dithiocarbamic acid.

14. A rubber composition which has been vulcanized in the presence of a metallic salt of an o,o' alkylidene-diaryl dithiocarbamic acid.

15. A rubber composition which has been vulcanized in the presence of zinc o,o' isopropylidene-diphenyl dithiocarbamate.

16. A rubber composition which has been vulcanized in the presence of an o,o' alkylidene-diaryl thiuram sulfide.

17. A rubber composition which has been vulcanized in the presence of a bis (o,o' alkylidene-diaryl) thiuram disulfide.

18. A rubber composition which has been vulcanized in the presence of bis (o,o' isopropylidene-diphenyl) thiuram disulfide.

19. A rubber composition which has been vulcanized in the presence of an ester of an o,o' alkylidene-diaryl dithiocarbamic acid.

20. A rubber composition which has been vulcanized in the presence of 2,4 dinitrophenyl o,o' isopropylidene-diphenyl dithiocarbamate.

WALDO L. SEMON.